United States Patent
Imaie et al.

(10) Patent No.: US 7,315,144 B2
(45) Date of Patent: Jan. 1, 2008

(54) AC DRIVE APPARATUS, VEHICLE CONTROL APPARATUS, AND POWER CONVERSION METHOD AND VEHICLE CONTROL METHOD

(75) Inventors: Kazuhiro Imaie, Hitachi (JP); Takashi Yagyu, Ushiku (JP); Keizo Shimada, Hitachi (JP); Yasuhiro Kiyofuji, Hitachi (JP); Naoshi Sugawara, Hitachi (JP)

(73) Assignees: Hitachi, Ltd., Tokyo (JP); Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 11/354,908

(22) Filed: Feb. 16, 2006

(65) Prior Publication Data

US 2006/0181235 A1    Aug. 17, 2006

(30) Foreign Application Priority Data

Feb. 17, 2005    (JP)    ............................. 2005-039940

(51) Int. Cl.
*H02P 3/22*    (2006.01)
(52) U.S. Cl. ...................................... 318/380; 318/139
(58) Field of Classification Search ................ 318/362, 318/371, 375, 376, 379–381, 139; 105/26.05
See application file for complete search history.

(56) References Cited

U.S. PATENT DOCUMENTS

| | | | | |
|---|---|---|---|---|
| 3,743,901 A | * | 7/1973 | Johnson | ........................ 318/87 |
| 3,930,191 A | * | 12/1975 | Loderer | ........................ 318/376 |
| 4,093,900 A | * | 6/1978 | Plunkett | ...................... 318/370 |
| 4,904,918 A | * | 2/1990 | Bailey et al. | ................ 318/762 |
| 5,170,105 A | * | 12/1992 | Kumar | ......................... 318/362 |
| 5,723,956 A | * | 3/1998 | King et al. | .................. 318/139 |
| 6,078,156 A | * | 6/2000 | Spurr | .......................... 318/368 |
| 6,445,879 B1 | * | 9/2002 | Youn et al. | .................. 388/811 |
| 6,612,245 B2 | * | 9/2003 | Kumar et al. | ............. 105/26.05 |
| 6,973,880 B2 | * | 12/2005 | Kumar | .......................... 105/35 |
| 7,012,392 B2 | * | 3/2006 | Nguyen et al. | ............. 318/376 |
| 7,137,344 B2 | * | 11/2006 | Kumar et al. | .................. 105/35 |

FOREIGN PATENT DOCUMENTS

| | | |
|---|---|---|
| AU | 2005242120 | 12/2005 |
| JP | 6046505 | 2/1994 |
| JP | 2002-064901 | 2/2002 |

* cited by examiner

*Primary Examiner*—Bentsu Ro
(74) *Attorney, Agent, or Firm*—Antonelli, Terry, Stout & Krauss, LLP.

(57) ABSTRACT

A motor is driven with variable frequency AC power converted from DC power, and an AC output power from the motor is converted to DC. In the conversion, an electromotive force regenerated by the motor is consumed by a plurality of resistors. When the consumption of the electromotive force is impeded in any of systems including any of the plurality of resistors, the electromotive force is consumed by the systems including the remaining resistors. Even if a system including any of the plurality of resistors fails, the electromotive force can by consumed by the other systems including the remaining resistors, thus providing a reliable rheostatic brake.

21 Claims, 6 Drawing Sheets

FIG. 6C

AC DRIVE APPARATUS, VEHICLE CONTROL APPARATUS, AND POWER CONVERSION METHOD AND VEHICLE CONTROL METHOD

CROSS-REFERENCE TO RELATED APPLICATIONS

The present invention is related to U.S. patent application Ser. No. 11/297,490 entitled "Electric Drives System for Vehicle, Electric Control System for Vehicle, Electric Drive Method for Vehicle", filed on Dec. 9, 2005.

BACKGROUND OF THE INVENTION

The present invention relates to an AC drive apparatus, a vehicle control apparatus, a power conversion method, and a vehicle control method.

With the advance of power electronics, a vehicle drive system, for example, has increasingly employed an AC motor instead of a DC motor. In such a system which employs an AC motor, electric energy is supplied to the motor for use as motive energy upon startup of the system, and a so-called rheostatic brake is employed for forcing the motor to operate as a generator upon braking such that electric energy generated thereby is consumed by a resistor to produce a braking force. Such a system is shown, For example, in JP-A-6-46505.

SUMMARY OF THE INVENTION

However, the foregoing system cannot produce the braking force if the rheostatic brake fails. While a mechanical brake is often provided together with an electric brake to enable the production of a braking force by applying a friction force to an axil, the rheostatic brake tends to produce a larger braking force and requires less maintenance operations than the mechanical brake, so that the mechanical brake is used only during low-speed operations or for a final stop. Therefore, the rheostatic brake has been requested to improve the reliability. It is an object of the present invention to provide an AC drive apparatus which has a reliable rheostatic brake, a vehicle control apparatus, a power conversion method, and a vehicle control method.

To achieve the above object, an AC drive apparatus of the present invention includes a plurality of electric brakes each including a resistor for consuming an electromotive force regenerated by a motor, and a switch for connecting the resistor. If the consumption of the electromotive force is impeded in one of electric brakes including any of the plurality of resistors, the electromotive force Is consumed by electric brakes including the remaining resistors.

More specifically, the AC drive apparatus has a plurality of rheostatic brakes, each brake is connected to DC section through a switch, and the DC section is configured between a rectifier of which power is from a prime mover and the bidirectional converter of which power is from AC motor.

According to the present invention, the AC drive apparatus realized thereby comprises reliable electric brakes More specifically, an electromotive force regenerated as DC power through the bidirectional converter is consumed by a plurality of rheostatic brakes to produce a braking force. Also, when some of the plurality of rheostatic brakes fails, the failed rheostatic brake is disconnected, such that a vehicle operator can still continue a vehicle decelerating operation, or can keep enough time to transit to a mechanical bake because an entire braking force is not lost, though the braking force becomes lower than when all the rheostatic brakes are sound. Generally, in recent years, a forced cooling scheme based on an electric fan Is employed in the rheostatic brake with the intention of improving the utilization factor and reducing the size and weight. For this reason, opportunities of failure are increasing, so that the present invention is also effective as means which responds to the need for both the reduction in size and weight and the improvement in reliability.

Other objects, features and advantages of the invention will become apparent from the following description of the embodiments of the invention taken in conjunction with the accompanying drawings.

BRIEF DESCRIPTION OF THE DRAWINGS

FIGS. 6A, 6B, 6C are diagrams illustrating a cooling unit in detail.

DETAILED DESCRIPTION OF THE EMBODIMENTS

In the following, embodiments of the present invention will be described with reference to the accompanying drawings in the order of a first to a third embodiment.

First Embodiment

Figure 1:
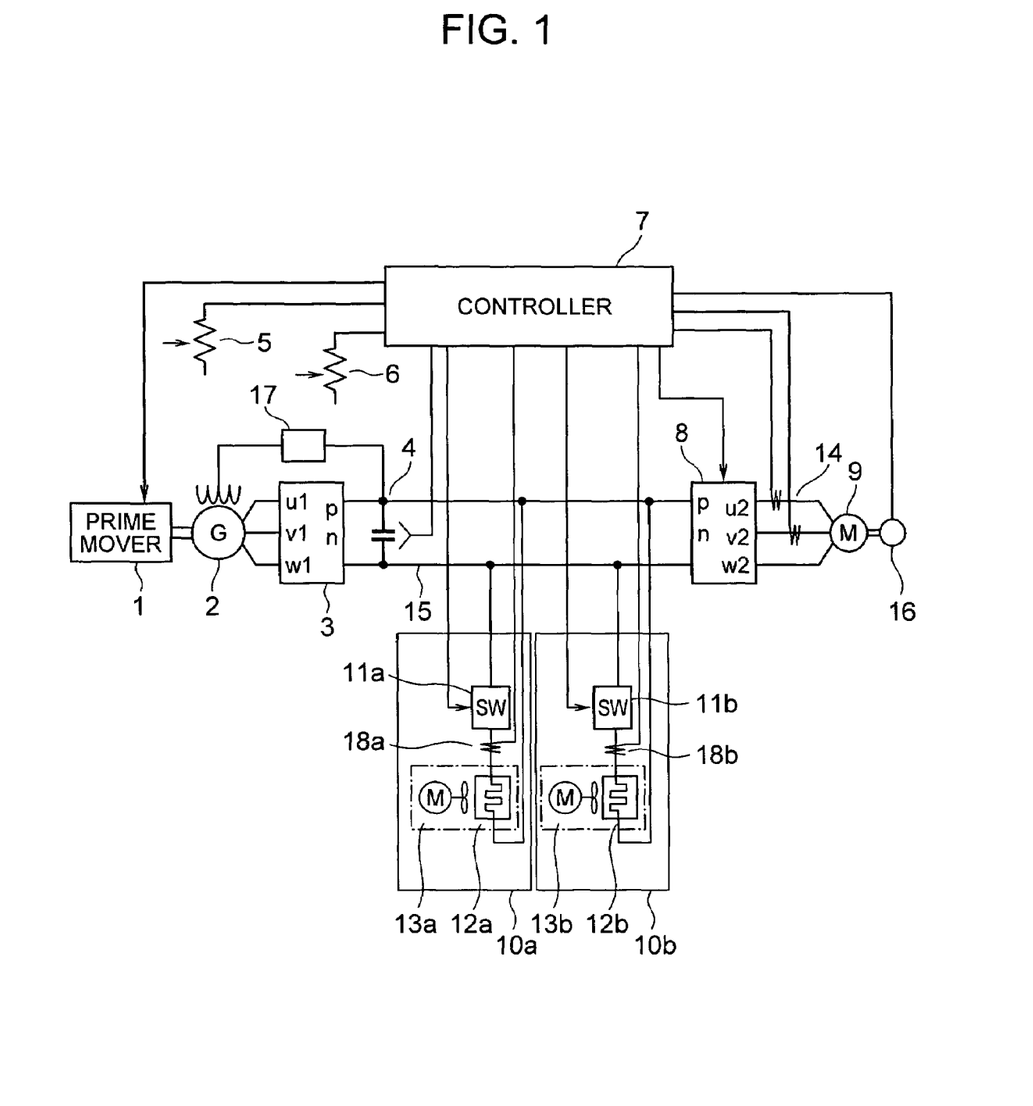
FIG. 1 is a block circuit diagram illustrating a method of implementing an AC drive system which comprises a prime mover as a power source, and a plurality of rheostatic brake circuits (First Embodiment)

An AC drive system of the present invention comprises a plurality of rheostatic brakes connected in parallel to achieve the object of avoiding a loss of an overall braking force due to a failure of a rheostatic brake. FIG. 1 illustrates the AC drive system according to a first embodiment of the present Invention. An AC generator 2 (or called the "main generator 2," which is also applied to the following description) driven by a prime mover 1 feeds an AC output to a rectifier 3. The rectifier 3 outputs a DC voltage which includes ripples reduced by a smoothing capacitor 4. For setting the DC voltage to a required value which Is calculated by a controller 7, a field regulator 17 controls an exciting current of the generator 2. This DC voltage is fed to a motor 9 through a bidirectional converter 8 which converts the DC voltage to an AC voltage at art arbitrary frequency. Output values of an output current detector 14 associated with the bidirectional converter 8 and a speed detector 16 are fetched into a controller 7 which determines a switching state of the bidirectional converter 8 together with a motor output torque setting unit 5 and a voltage across a smoothing capacitor, and outputs a switching pulse to the bidirectional converter 8. With these operations, a vehicle equipped with the AC drive system conducts acceleration/deceleration control.

Figure 2:
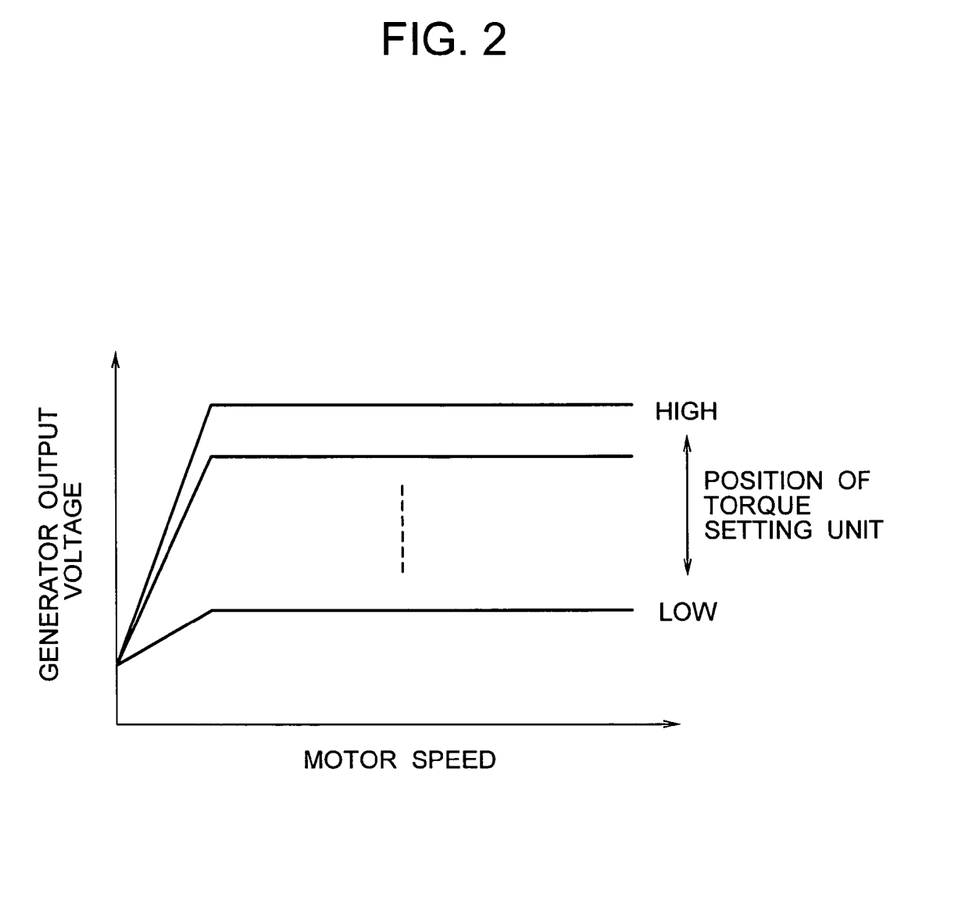
FIG. 2 is a graph showing an exemplary AC voltage control characteristic.

When the vehicle is accelerated, a torque is determined based on an accelerator unit 5 trodden state and output values of the current detector 14 associated with the bidirectional converter 8 and the speed detector 16. To provide the determined torque to the motor, the controller 7 controls the rotation speed of the prime mover 1 by using the values of the output current detector 14, speed detector 16 and DC voltage detector 15 in a relationship as shown in FIG. 2. Likewise, to determine a switching state of the bidirectional converter 8, the output values of the output current detector 14, the speed detector 16, the torque setting unit 5 and the voltage across the smoothing capacitor are supplied to the controller 7. Since the motor 9 generates an increasingly larger torque as the bidirectional converter 8 supplies an AC current at a higher frequency, the vehicle is accelerated.

Figure 3:
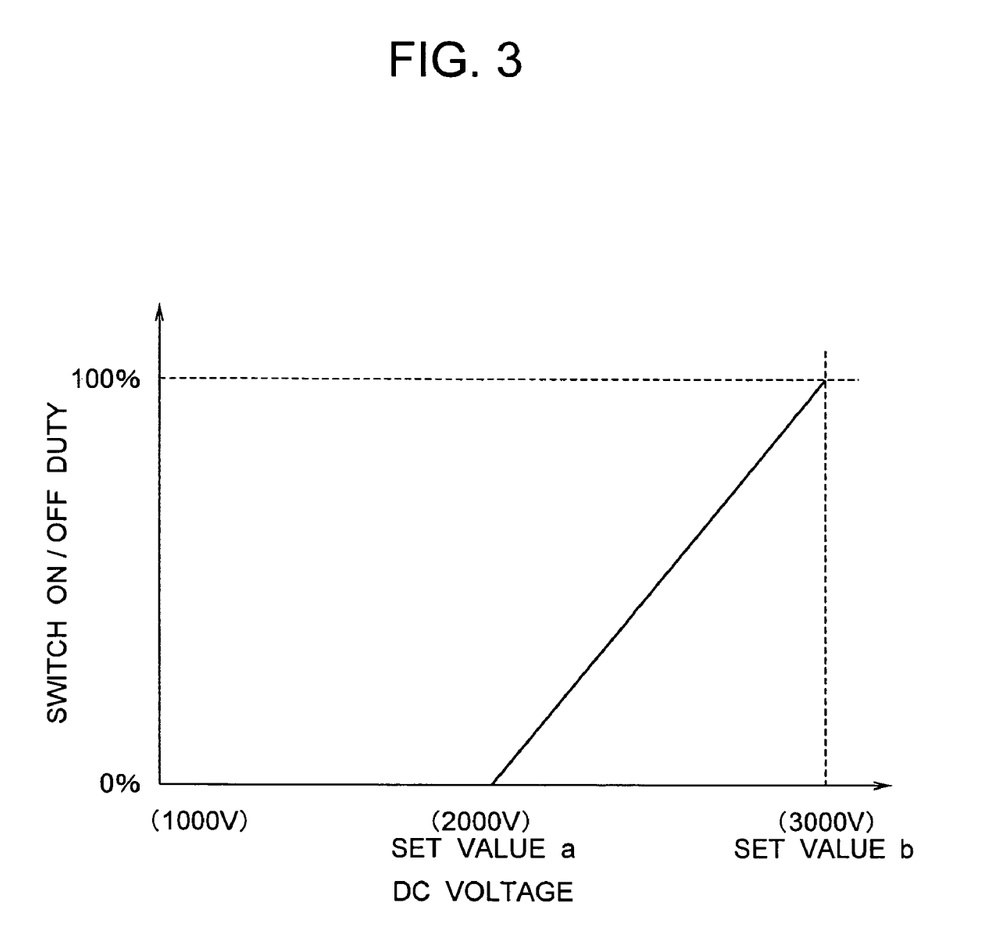
FIG. 3 is a graph showing an exemplary control characteristic of a DC voltage versus switch on/off duty.

When the vehicle is decelerated, the motor 9 enters a regenerative mode to convert motive energy of the vehicle to AC electric energy. This AC electric energy is converted to DC power by the bidirectional converter 8. In this event, a DC voltage outputted by the bidirectional converter 8 is controlled to a higher value than a DC voltage which is outputted by the generator 2 through the rectifier 3. The controller 7 determines a time for which a resistor a (12*a*) of an electric brake a (10*a*) and a resistor b (12*b*) of an electric brake b (10*b*) are connected to a DC section, ie., a duty in accordance with the values of the DC voltage detector 15 and a braking force setting unit 6, as well as a difference between the two values. Switches 11*a*, 11*b* for connecting the resistors a (12*a*, b (12*b*) to the DC section, which comprise semiconductor devices or the like, start an on/off operation when the DC voltage value exceeds a set value a (2,000 volts by way of example), for example, as shown in FIG. 3, and repeat the on/off operation such that the DC voltage value falls within a set value b (3,000 volts by way of example). In this event, in a range of 100 to 2,000 volts, the switches 11*a*, 11*b* remain off.

Further, the on/off duty is increased as the DC voltage value is increased, and the on/off duty is set to 100% when the DC voltage value reaches a set value b, for example, as shown in FIG. 3 (i.e., the switches 11*a*, 11*b* remain on).

The controller 7 detects currents passing through the resistors a, b by current detectors 18*a* and 18*b*, and calculates the power consumed by the resistors a, b such that the electric energy generated by the motor 9 is entirely consumed by the resistors a, b. With these operations, the vehicle equipped with the AC drive system is decelerated.

If one of the rheostatic brakes 10*a*, 10*b* fails during the decelerating operation, the electric energy generated by the motor 9 cannot be entirely consumed. Thus, if the same electric energy as that before the failure was continuously regenerated to the DC section, the DC voltage would continue to rise and eventually exceed the withstanding voltage level of each device, so that, for preventing this inconvenience, the regenerated energy must be limited. Since the regenerated energy is limited by the capacity of a sound rheostatic brake, a conventional vehicle equipped only with a single rheostatic brake results in a temporary loss of an entire braking force However, the AC drive system according to the present invention illustrated in FIG. 1 comprises a plurality of rheostatic brakes, so that even it the electric brake 10*a* (also called the "rheostatic brake 10*a*") fails, the switch a is made inoperative, and the second electric brake 10*b* (also called the "rheostatic brake 10*b*") can continue the braking operation though the braking force is reduced to one-half as much as when the whole system is sound.

Figure 6B:
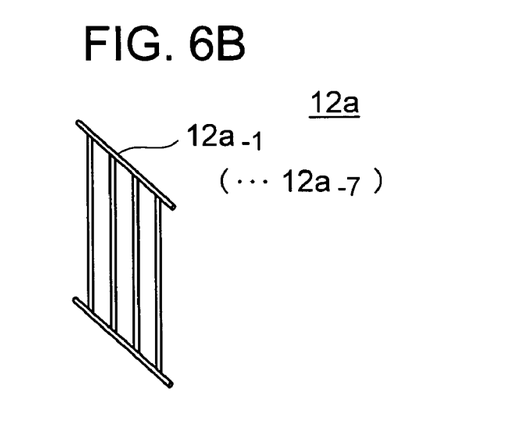
Figure 6C:
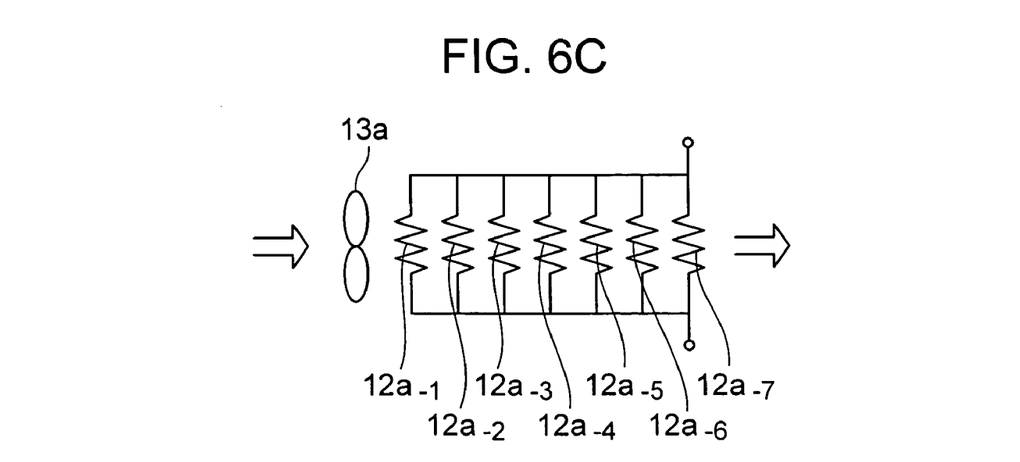

Referring now to FIGS. 6A, 6B, 6C, a detailed description will be given of the structure of a cooling unit composed of the resistor a (12*a*) and a cooling fan a (13*a*) (an area surrounded by a one-dot chain line within the electric brake 10*a*), and a cooling unit composed of the resistor b (12*b*) and a cooling fan b (13*b*) (an area surrounded by a one-dot chain line within the electric brake 10*b*). Since the former cooling unit is substantially identical in configuration to the latter cooling unit, the following description will focus on the cooling unit composed of the resistor a (12*a*) and cooling fan a (13*a*) in FIG. 1.

As illustrated in FIG. 6A, a housing comprises a cylinder housing and a square pillar housing connected thereto, both of which are made of metal (preferably, a steel plate). The cooling fan a (13*a*) is stored in the cylindrical housing. The cooling fan a (13*a*) rotates to feed cooling air in a direction indicated by arrows in the figure. The cooling air passes through the square pillar housing, flowing as indicated by the right-hand arrow in the figure, and is emitted from the square pillar housing by an air blasting action of the cooling fan a (13*a*).

As illustrated in FIG. 6B, resistor elements 12*a*-1-12*a*-7, which make up the resistor a (12*a*), are arranged side by side within the square pillar housing in the air blasting direction. The cooling air fed by the cooling fan a (13*a*) sequentially cools down the resistor elements 12*a*-1-12*a*-7. Each of the resistor elements 12*a*-1-12*a*-7 is composed of an upper metal plate and a lower metal plate which are connected by four metal plates for example. Electric couplers are attached to both ends of the upper metal plate.

The foregoing electric couplers are electrically connected to each other to make up an electric circuit as illustrated in FIG. 6C.

Here, as illustrated in FIG. 6A, a temperature sensor 22*a* is mounted halfway in the cylindrical housing in the air passing direction. The temperature sensor 22*a* detects the temperature within the cylindrical housing to send a temperature signal to the controller 7. Also, a pressure sensor 23*a* is mounted near the rear end of the cylindrical housing in the air passing direction. The pressure sensor 23*a* detects the pressure to find the fan working soundly near the exit of the cylindrical housing to send a pressure signal to the controller 7, so as to increase reliability of the electric brake.

The controller 7 monitors the temperature signal and pressure signal, and determines an abnormal temperature or an abnormal pressure if one (or both) of these signals reaches a predetermined value or higher to bring the switches 11*a*, 11*b* into a disconnected state. Alternatively, the controller 7 controls the switches 11*a*, 11*b* such that they remain off for a longer time in their on/off operations.

Second Embodiment

Figure 4:
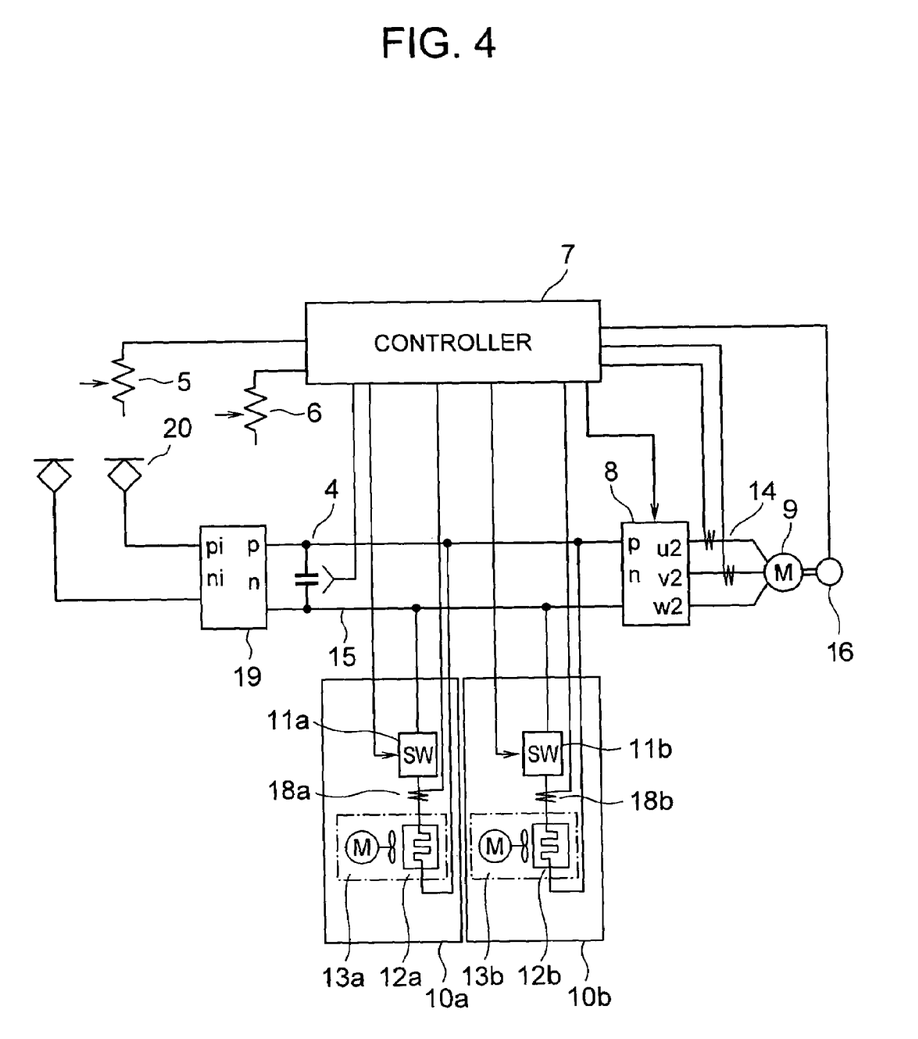
FIG. 4 is a block circuit diagram illustrating a method of implementing an AC drive system which comprises a trolley as a power source, and a plurality of rheostatic brake circuits (Second Embodiment)

An AC drive system according to a second embodiment comprises a trolley which is substituted for the components of the first embodiment for connecting the AC output of the AC generator 2 driven by the prime mover 1 to the rectifier 3 to supply DC power in the first embodiment. In a system which comprises a trolley 20 that does not have a capacity large enough to absorb regenerated power, a vehicle itself must consume the regenerated power. Therefore, when a braking force is required, the trolley is disconnected from the AC drive system by a trolley connector 19 upon detection of a positive output from the braking force setting unit 6, in order to prevent the power from flowing from the trolley to the resistors 11*a*, 11*b* of the rheostatic brakes 10*a*, 10*b*. In this way, the AC rive system of the second embodiment can perform similar operations to those of the first embodiment.

Third Embodiment

Figure 5:
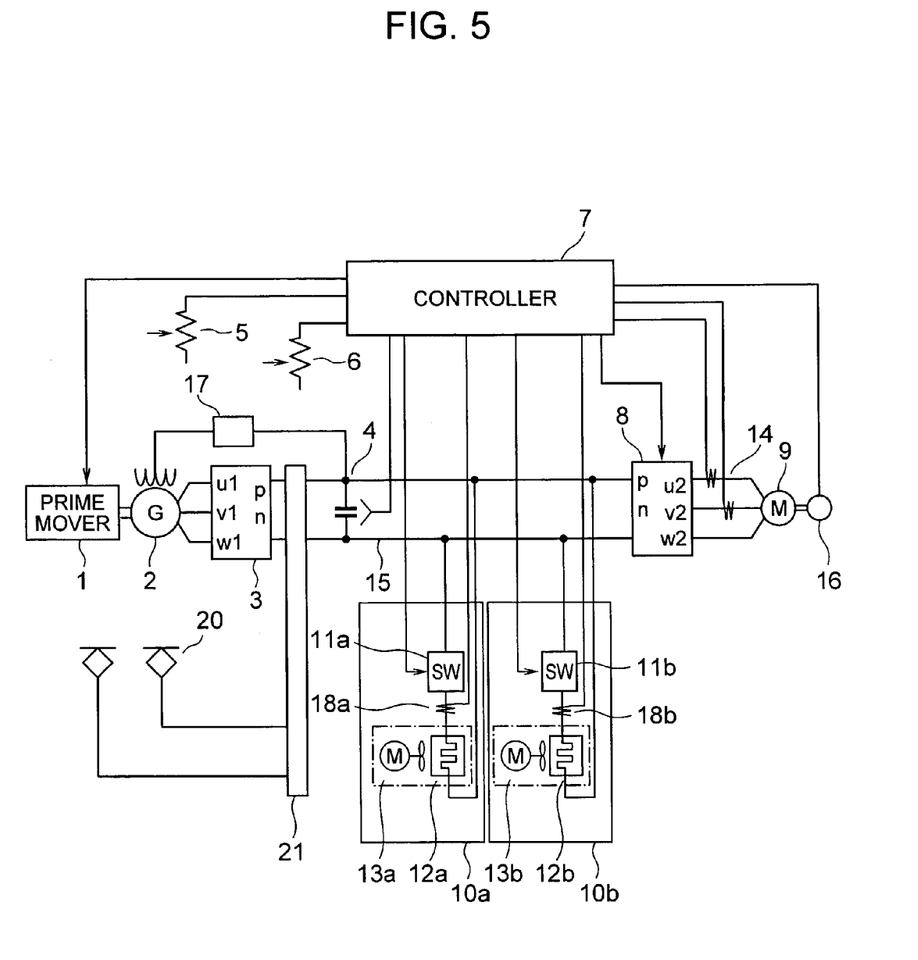
FIG. 5 is a block circuit diagram illustrating a method of implementing an AC drive system which comprises a prime mover and a trolley as power sources, and a plurality of rheostatic brake circuits (Third Embodiment)

An AC drive system according to a third embodiment comprises both means for connecting the AC output of the AC generator 2 driven by the prime mover 1 to the rectifier 3 to supply DC power in the first embodiment, and means for supplying DC power by a trolley 20 in the second embodiment. A special vehicle system such as an electric truck may be provided with the power through a trolley 20, but must operate even in a place where the trolley is not installed. Thus, the AC drive system continues to operate while switching the power source by a trolley/motor switching unit 21 between the power generated by the prime mover 1 and the power supplied through the trolley 2. In this way, the AC drive system of the third embodiment can perform similar operations to those of the first and second embodiments.

The configurations of the first to third embodiments can also be applied to an electric propeller ship which employs a grid resistor for a speed restraining operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An AC drive apparatus comprising:
a bidirectional converter for converting DC power to variable frequency AC power for driving a motor, and converting an AC output from said motor to DC;
a plurality of electric brakes each including a resistor connected to said bidirectional converter to consume an electromotive force regenerated by said motor, and a switch for connecting and disconnecting said resistor to and from said bidirectional converter; and
a controller adapted to control duty in said switch, which duty is a time ratio of connection of said resistors to DC power in accordance with a comparison between voltage value and setting value of said DC power, wherein:
when the voltage value of said DC is within a first voltage range, said duty is rendered a predetermined value,
when the voltage value of said DC is within a second voltage range which is a larger voltage compared to said first voltage range, said duty, which is in accordance with the voltage value of said DC, becomes larger compared to said duty of said first voltage range at least in a part of said range, and
when the voltage value of said DC is within a third voltage range which is a larger voltage compared to said second voltage range, said duty is set to a large predetermined value compared to at least the duty corresponding to said second voltage range.

2. An AC drive apparatus according to claim 1, wherein said bidirectional converter is connected to a trolley system to prevent power from flowing into said trolley system.

3. An AC drive apparatus according to claim 1, wherein said bidirectional converter is connected to an output of a generator through a rectifier.

4. An AC drive apparatus according to claim 3, wherein said switch periodically turns on and off at a period which is controlled on the basis of the regeneration state.

5. An AC drive apparatus according to claim 4, wherein said generator is driven by a prime mover, and said prime mover is controlled for rotating speed based on an operating condition of a vehicle.

6. An AC drive apparatus according to claim 1, wherein said resistor is applied with a current when a voltage associated with said converter increases beyond a predetermined value.

7. An AC drive apparatus according to claim 1, wherein said resistor is cooled down by a fan, and the operation of said resistor is limited when the temperature or pressure of cooling air rises to a predetermined level or higher.

8. An AC drive apparatus, comprising:
a bidirectional converter for converting DC power to variable frequency AC power for driving a motor, and converting an AC output from said motor to DC,
wherein said bidirectional converter is connected to a trolley system to prevent power from flowing into said trolley system;
a plurality of electric brakes each including a resistor connected to said bidirectional converter to consume an electromotive force regenerated by said motor, and a switch for connecting and disconnecting said resistor to and from said bidirectional converter;
a controller adapted to control duty in said switch, which duty is a time ratio of connection of said resistors to DC power in accordance with a comparison between voltage value and setting value of said DC power; and
means for connecting said bidirectional converter to said trolley system and also to an output of a generator through a rectifier, and for preventing the output of said generator from flowing into said trolley system.

9. A vehicle control apparatus comprising:
a prime mover;
a generator mechanically connected to said prime mover;
a rectifier for rectifying an output of said generator to DC;
a bidirectional converter connected to said rectifier;
a motor connected to said bidirectional converter, and having an output transmitted to wheels;
said bidirectional converter converting the rectified output to a variable frequency AC output power for driving said motor, and converting an AC output power from said motor to DC power;
a plurality of electric brakes each including a resistor connected to said bidirectional converter to consume an electromotive force regenerated by said motor, and a switch for connecting and disconnecting said resistor to and from said bidirectional converter; and
a controller adapted to control duty in said switch, which duty is a time ratio of connection of said resistors to DC power in accordance with a comparison between voltage value and setting value of said DC power, wherein:
when the voltage value of said DC is within a first voltage range, said duty is rendered a predetermined value,
when the voltage value of said DC is within a second voltage range which is a larger voltage compared to said first voltage range, said duty, which is in accordance with the voltage value of said DC, becomes larger compared to said duty of said first voltage range at least in a part of said range, and
when the voltage value of said DC is within a third voltage range which is a larger voltage compared to said second voltage range, said duty is set to a large predetermined value compared to at least the duty corresponding to said second voltage range.

10. A vehicle control apparatus according to claim 9, wherein said resistors are applied with a current when a voltage associated with said converter increases beyond a predetermined value.

11. A vehicle control apparatus according to claim 9, wherein said resistors are cooled down by a fan, and the operation of said resistor is limited when the temperature or pressure of cooling air rises to a predetermined level or higher.

12. A power conversion method for converting, via a bi-directional converter, DC power to variable frequency AC power for driving an electric motor and converting an AC output power from said motor to DC, said method comprising:
   consuming an electromotive force regenerated by said motor by a plurality of resistors which are connected and disconnected to the bi-directional converter by a switch,
   when the consumption of the electromotive force is impeded in any of systems including any of said plurality of resistors, consuming the electromotive force by the remaining systems including the other resistors; and
   controlling duty in said switch, which duty is a time ratio of connection of said resistors to DC power in accordance with a comparison between voltage value and setting value of said DC power, wherein:
   when the voltage value of said DC is within a first voltage range, said duty is rendered a predetermined value,
   when the voltage value of said DC is within a second voltage range which is a larger voltage compared to said first voltage range, said duty, which is in accordance with the voltage value of said DC, becomes larger compared to said duty of said first voltage range at least in a part of said range, and
   when the voltage value of said DC is within a third voltage range which is a larger voltage compared to said second voltage range, said duty is set to a large predetermined value compared to at least the duty corresponding to said second voltage range.

13. A power conversion method according to claim 12, further comprising:
   starting to apply said resistors with a current when a voltage associated with said converter increases beyond a predetermined value.

14. A power conversion method according to claim 13, wherein said resistor is cooled down by a fan, and the operation of said resistors are limited when the temperature or pressure of cooling air rises to a predetermined level or higher.

15. A vehicle control method for generating electric power by a rotating force of a prime mover, converting the generated output to DC power, converting, via a bidirectional converter, the DC power to variable frequency AC power for driving a motor and converting an AC power output from said motor to DC power, and rotating wheels by a rotating force of said motor, said method comprising:
   consuming an electromotive force regenerated by said motor by a plurality of resistors which are connected and disconnected to the bidirectional converter by a switch,
   when the consumption of the electromotive force is impeded in any of systems including any of said plurality of resistors, consuming the electromotive force by the remaining systems including the other resistors; and
   controlling duty in said switch, which duty is a time ratio of connection of said resistors to DC power in accordance with a comparison between voltage value and setting value of said DC power, wherein:
   when the voltage value of said DC is within a first voltage range, said duty is rendered a predetermined value,
   when the voltage value of said DC is within a second voltage range which is a larger voltage compared to said first voltage range, said duty, which is in accordance with the voltage value of said DC, becomes larger compared to said duty of said first voltage range at least in a part of said range, and
   when the voltage value of said DC is within a third voltage range which is a larger voltage compared to said second voltage range, said duty is set to a large predetermined value compared to at least the duty corresponding to said second voltage range.

16. A vehicle control method according to claim 15, further comprising:
   starting to apply said resistors with a current when a voltage associated with said converter increases beyond a predetermined value.

17. A vehicle control method according to claim 15, wherein said resistors are cooled down by a fan, and the operation of said resistors are limited when the temperature or pressure of cooling air rises to a predetermined level or higher.

18. An AC drive apparatus comprising:
   a bidirectional converter for converting DC power to variable frequency AC power for driving a motor, and converting an AC output from said motor to DC;
   a plurality of electric brakes each including a resistor connected to said bidirectional converter to consume an electromotive force regenerated by said motor, and a switch for connecting and disconnecting said resistor to and from said bidirectional converter;
   wherein said bidirectional converter is connected to a trolley system to prevent power from flowing into said trolley system,
   further comprising means for connecting said bidirectional converter to said trolley system and also to an output of a generator through a rectifier, and for preventing the output of said generator from flowing into said trolley system.

19. An AC drive apparatus comprising:
   a bidirectional converter for converting DC power to variable frequency AC power for driving a motor, and converting an AC output from said motor to DC;
   a plurality of electric brakes each including a resistor connected to said bidirectional converter to consume an electromotive force regenerated by said motor, and a switch for connecting and disconnecting said resistor to and from said bidirectional converter; and
   a controller adapted to control duty in said switch, which duty is a time ratio of connection of said resistors to DC power in accordance with a comparison between voltage value and setting value of said DC power,
   wherein said duty, which is in accordance with the voltage value of said DC, is continuous from that of a first voltage range to a second, larger voltage range, or from that of said second voltage range to a third voltage range, which is larger than the second voltage range.

20. An AC drive apparatus comprising:
   a bidirectional converter for converting DC power to variable frequency AC power for driving a motor, and converting an AC output from said motor to DC;
   a plurality of electric brakes each including a resistor connected to said bidirectional converter to consume an electromotive force regenerated by said motor, and a switch for connecting and disconnecting said resistor to and from said bidirectional converter; and a controller adapted to control duty in said switch, which duty is a time ratio of connection of said resistors to DC power in accordance with a comparison between voltage value and setting value of said DC power, wherein said duty, which is in accordance with the voltage value of said DC, is set to "0", when the voltage value of said DC is within a first voltage range and said duty is continuous from that of said first voltage range to a second, larger voltage range, or from that of said second voltage range to a third voltage range, which is larger than the second voltage range.

21. An AC drive apparatus comprising:

a bidirectional converter for converting DC power to variable frequency AC power for driving a motor, and converting an AC output from said motor to DC;

a plurality of electric brakes each including a resistor connected to said bidirectional converter to consume an electromotive force regenerated by said motor, and a switch for connecting and disconnecting said resistor to and from said bidirectional converter; and a controller adapted to control duty in said switch, which duty is a time ratio of connection of said resistors to DC power in accordance with a comparison between voltage value and setting value of said DC power, wherein said duty, which is in accordance with the voltage value of said DC, is set to "0", when the voltage value of said DC is within a first voltage range and said duty is continuous from that of said first voltage range to a second, larger voltage range, or from that of said second voltage range to a third voltage range, which is larger than the second voltage range, said duty within said third voltage range being retained at a predetermined value.

* * * * *